United States Patent [19]

Phelps et al.

[11] Patent Number: 4,993,224

[45] Date of Patent: Feb. 19, 1991

[54] FLUID MIXING APPARATUS

[75] Inventors: Colin N. Phelps, Pyrford; William J. Southgate, Farnborough, both of England

[73] Assignee: Calor Gas Limited, Slough, England

[21] Appl. No.: 404,580

[22] Filed: Sep. 8, 1989

[30] Foreign Application Priority Data

Oct. 27, 1988 [GB] United Kingdom ................ 8825149

[51] Int. Cl.⁵ .......................... F01N 3/18; F01N 3/30
[52] U.S. Cl. ........................ 60/274; 60/307; 137/602; 137/896
[58] Field of Search .............. 60/307, 308, 274; 137/602, 896

[56] References Cited

U.S. PATENT DOCUMENTS

| | | | |
|---|---|---|---|
| 2,531,127 | 11/1950 | Hershey | 137/602 |
| 3,113,418 | 12/1963 | Campbell | 60/307 |
| 3,486,326 | 12/1969 | Hermes | 60/307 |
| 3,613,359 | 10/1971 | Posh | 60/308 |
| 3,734,111 | 5/1973 | McClintock | 137/896 |
| 4,519,423 | 5/1985 | Ho | 137/896 |

Primary Examiner—Douglas Hart
Attorney, Agent, or Firm—Watson, Cole, Grindle & Watson

[57] ABSTRACT

Apparatus is provided for mixing an oxygen containing gas, for example air, with exhaust gas from a liquefied petroleum gas (LPG) fuelled internal combustion engine, the mixture bieng supplied to a catalytic converter to reduce the level of carbon monoxide in the exhaust gas. The apparatus comprises a first duct for supplying the exhaust gas to a catalytic converter, and a second duct having a closed end extending transversely into the first duct for supplying air to mix with the exhaust gas. Opening means are provided in the wall of the second duct to allow air, pumped under pressure to the second duct by an engine driven pump, to flow into and mix with the exhaust gas. The opening means decrease in flow section in the direction of the closed end of the second duct and open transversely of the flow of exhaust gas through the first duct to provide a high velocity flow of air causing turbulence and good mixing of the air and exhaust gases, thus enabling the catalytic converter to achieve a high level of efficiency of carbon monoxide conversion.

25 Claims, 3 Drawing Sheets

FLUID MIXING APPARATUS

The present invention relates to a method and apparatus for mixing fluids and particularly, but not exclusively, to a method and apparatus for mixing air with the exhaust gas of a liquefied petroleum gas (LPG) fuelled internal combustion engine to reduce the levels of carbon monoxide contained therein.

Forklift trucks with LPG fuelled internal combustion engines are used in enclosed spaces. If the enclosed space is well ventilated and the engine is maintained at the correct running conditions, the level of carbon monoxide in the exhaust can be kept sufficiently low for safety, for example such that the requirements of the UK Health & Safety at Work Act, that atmospheric levels of carbon monoxide be less than 50 ppm, can be easily met. However, if in operation, the engine running conditions are not correctly maintained, the carbon monoxide levels in the exhaust can increase substantially. This arises because such engines have basic carburation equipment, and are much slower running than road vehicle engines, for example having a maximum speed of the order of only 3000 rpm. With road vehicles, the carburation equipment is sufficiently sophisticated that carbon monoxide levels in the exhaust vary relatively little. However, with forklift trucks the carbon monoxide in the exhaust can vary from as little as 1% under full load when the engine is correctly tuned to as much as 6.0% under full load if not correctly tuned.

It has been proposed to remove carbon monoxide from vehicle engine exhaust gases by converting the carbon monoxide into carbon dioxide using a catalytic converter. Such equipment is in use with petrol fuelled internal combustion engines on road vehicles, but as mentioned above, its application to such vehicle engines is relatively straightforward because of the relatively small range of carbon monoxide levels encountered in such applications.

In applying the same type of arrangement to LPH fuelled internal combustion engines for forklift trucks, the applicant has found that the efficiency of carbon monoxide removal is affected to a surprising extent by the manner in which the oxygen, which is required to support conversion, is introduced into the stream of exhaust gases flowing to the catalyst in the catalytic converter.

According to a first aspect of the present invention there is provided apparatus for introducing a first gas into a stream of a second gas comprising a first duct for supply with the second gas and a second duct extending into a portion of the first duct transversely with respect to the axis of the first duct portion, the second duct having an open end for connection to a supply of the first gas at a pressure above that of the second gas, a closed end and opening means opening into the first duct for flow of the first gas into the first duct to mix with the second gas, the opening means extending longitudinally of the second of the second duct, the flow section of the opening means decreasing in the direction of the closed end thereof.

The opening means may comprise a plurality of openings, which may be spaced apart along the longitudinal extent of the second duct in one or more linear arrays, the area of the openings decreasing in the direction of the closed end of the second duct. The opening means may also open generally transversely of the direction of the axis of the first duct portion. The opening means may be symmetrically disposed around the longitudinal axis of the second duct.

The first duct portion may be circular in axial cross-section and the second duct may extend diametrically across the first duct portion.

The first gas is preferably air, which may be pumped to the second duct.

According to a further aspect of the present invention there is provided apparatus for reducing the level of carbon monoxide in the exhaust gas of an LPG fuelled internal combustion engine comprising a catalyst for converting carbon monoxide to carbon dioxide, means for supplying the exhaust gas to the catalyst comprising a first duct and means for introducing an oxygen containing gas into the stream of the exhaust gas in the first duct comprising a second duct extending into a portion of the first duct transversely with respect to the axis of the first duct portion, the second duct having an open end for connection to a pump for the supply of an oxygen containing gas under pressure, a closed end, and opening means opening into the first duct for flow of the oxygen containing gas into the first duct to mix with the exhaust gas, the opening means extending longitudinally of the second duct, the flow section of the opening means decreasing in the direction of the closed end of the second duct.

The opening means may be as described above.

The catalyst may be in the form of a matrix contained in a housing and the first duct portion may form part of the housing.

The apparatus may include pump means arranged to be driven by the engine or otherwise in accordance with the speed of the engine so that its speed will vary with the engine speed.

Preferably the oxygen containing gas is air which may be supplied from the air intake of the engine.

According to another aspect of the present invention there is provided a method of reducing the level of carbon monoxide in the exhaust gas of an LPG fuelled internal combustion engine comprising supplying the exhaust gas along a first duct to a catalyst for converting the carbon monoxide to carbon dioxide, supplying oxygen containing gas at a pressure higher than the pressure of the exhaust gas in the first duct to a second duct having a closed end and which extends transversely of and into the first duct, the second duct having opening means through which the oxygen containing gas flows into the first duct to mix with the exhaust gas therein, the opening means decreasing in flow section towards the closed end of the second duct.

The engine may be a relatively slow running engine having a maximum speed of the order of 3000 rpm, e.g. for a fork lift truck.

Preferably the oxygen containing gas is air and the pressure of this gas is varied with the engine speed.

Embodiments according to the present invention will now be described, by way of example only, with reference to the accompanying drawings.

Figure 1:
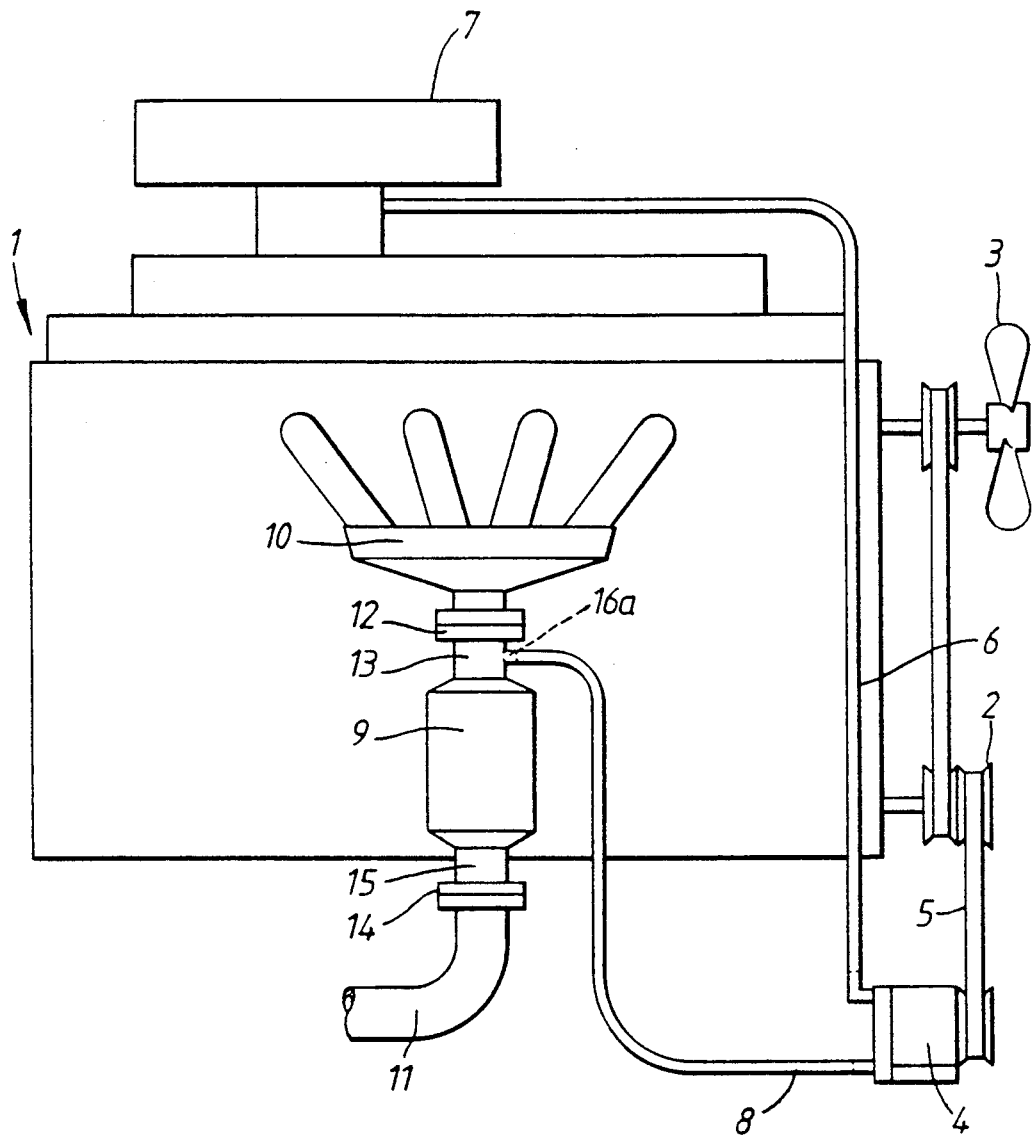
FIG. 1 is a schematic side elevational view of an LPG fuelled internal combustion engine for a fork lift truck and including a first embodiment of apparatus according to the present invention.

FIG. 1 shows a conventional LPG fuelled internal combustion engine 1 for a fork lift truck having a maximum speed of the order of 3000 rpm and modified to incorporate an embodiment of the present invention. The crankshaft pulley 2, in addition to driving a water pump (not shown) and a fan 3 as is conventional, drives an air pump 4 via a drive belt 5. The inlet of the air pump is connected to a hose 6 to take air from the air intake filter 7 and the pump 4 pumps the air via a hose 8 into the exhaust system of the engine upstream of a catalyst in a catalytic converter 9, for converting the carbon monoxide in the exhaust gas to carbon dioxide, to provide oxygen for the conversion. As shown the catalytic converter 9 is arranged in the exhaust system downstream of the exhaust manifold 10 and between the manifold and the exhaust downpipe 11. The converter is provided with a first inlet duct 13 for receiving exhaust gas from the manifold and provided at its inlet end with a flange 12 for connection to a similar flange on the manifold outlet. A flange 14 is also provided on the end of an outlet duct 15 for the converter for connection to a flange on the exhaust downpipe 11.

Figure 2:
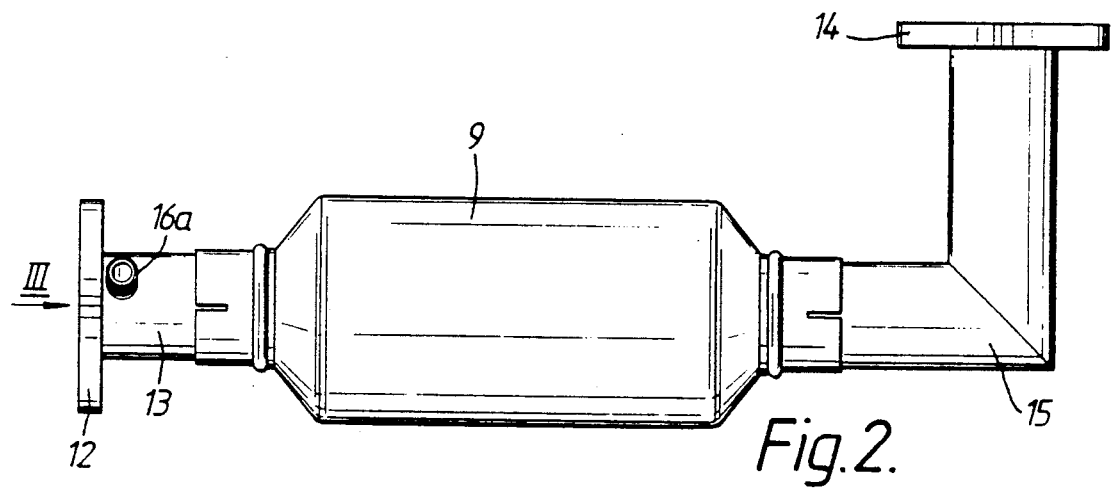
FIG. 2 is a side elevational view of part of the engine of FIG. 1 showing the first embodiment in greater detail.
Figure 3:
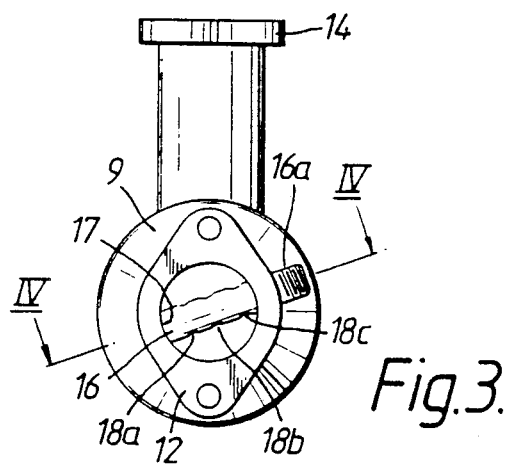
FIG. 3 is an end elevation of the apparatus of FIG. 2 in the direction of the arrow III in FIG. 2.
Figure 4:
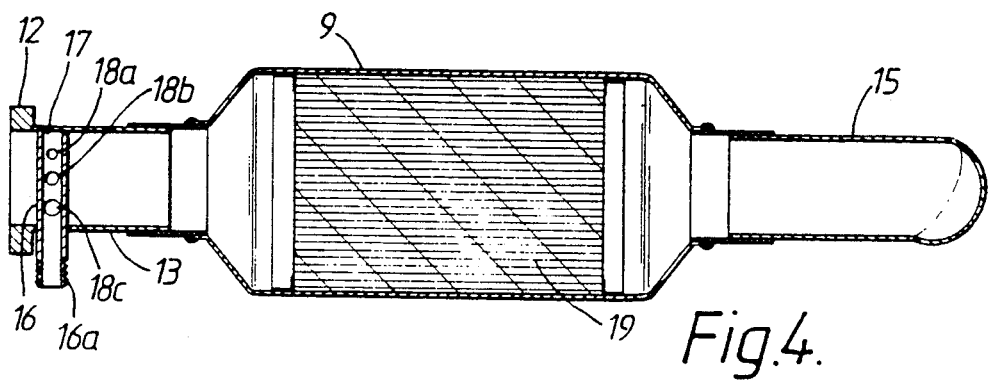
FIG. 4 is a section through the apparatus of FIG. 2 on the line IV—IV of FIG. 3.

The converter with ducts 13 and 15 is shown in greater detail in FIGS. 2 to 4. As shown the outlet end of the duct 13 is connected by an overlapping sleeve connection to the inlet of a housing in which a catalyst matrix 19 is received. The outlet of the housing is connected in the same way to the duct 15. The catalyst matrix may, for example be of a type manufactured by Johnson Matthey.

A second duct 16 for introducing air into the exhaust gas upstream of the catalyst matrix is in this embodiment arranged in the first duct 13 and is provided with a threaded connection 16a for attachment to the air hose 8. Exhaust gas and air are mixed together upstream of the catalyst matrix and the mixture supplied to the matrix in which the majority of the carbon monoxide is converted into carbon dioxide.

It has been found that the efficiency of the catalyst in removing carbon monoxide varies to a surprising extent with the manner of introduction of the air into the exhaust gas. FIGS. 2 to 4 show an embodiment of apparatus for introducing one gas into a stream of another gas which has been found to provide a very high level of carbon monoxide removal efficiency. The second duct 16 extends across the first duct 13 transversely with respect to the axis of the duct 13. Preferably as shown, duct 13 is circular in section and the duct 16 extends diametrically across it. The downstream end of the duct 16 is closed and may be fixed to the wall of the first duct 13 for example by welding. The upstream end of the duct 16 projects through the wall of the duct 13 and is provided with the threaded connection 16a as described above, for connection to the hose 8.

The duct 16 is provided with opening means 18 for flow therethrough of air from the duct 16 into duct 13 to mix with the exhaust gas. The opening means extend longitudinally of the duct 16 and are arranged to open into duct 13 generally transversely of the direction of flow of exhaust gas in duct 13 and are preferably arranged symmetrically of the axis of the duct 16.

Surprisingly it was found that carbon monoxide removal efficiency is optimised when the flow section of the opening means decreases in the direction of the closed end 17 of the duct 16.

As shown the opening means 18 comprise a plurality of openings 18a, 18b etc. spaced apart along the length of the duct 16 in two linear arrays positioned symmetrically about the axis of the duct 16 along each side of the duct 16 with the individual openings facing generally perpendicularly to the direction of flow of exhaust gas through duct 13 and to the direction of the axis of duct 13. In this particular embodiment each array comprises three circular openings 18a, 18b, 18c. The diameters of the openings 18a, 18b, 18c are in the ratio of 5:6:8 and the spacing between the centres of the openings 18a and 18b is approximately 4/5ths of the spacing between the centres of the openings 18b and 18c.

It will be appreciated that the opening means may take other forms which have flow sections which decrease in the direction of the closed end of duct 16. For example, the opening means may comprise a pair of, or two linear arrays of, slots of varying width extending longitudinally of the duct 16, one slot or one array arranged on each side of the duct 16 to open into duct 13 perpendicularly of the axis of duct 13. Alternatively the duct 16 may be provided with a plurality of similarly sized holes distributed along the length on each side of the duct 16, the density of the holes decreasing in the direction of the closed end.

The air supplied to the second duct 16 is at a pressure which is substantially higher than the pressure of the exhaust gas in the duct 13. For example the pressure of the air may be about double the pressure of the exhaust gas. Where the back pressure of the exhaust gas is of the order of 75 mm Hg the pressure of the air may be of the order of 150 mm Hg. This provides a high velocity of air flow from the opening means of the duct 16 which creates turbulence and this, combined with the distribution of the air in the duct 13 provided by the arrangement of the opening means, enables a rapid and efficient mixing of the air with the exhaust gas which in turn enables the catalyst to achieve high levels of efficiency.

The rate of flow of the air into duct 13 is arranged to provide sufficient oxygen to the catalyst for the anticipated maximum carbon monoxide level at any particular engine speed and load. For example, for a four cylinder engine having a capacity of 1971 cc, at an engine speed of 2000 rpm and a maximum load of 26.9 kilowatts, air is pumped by the pump 4 at a rate of 20 cubic feet a minute, the exhaust gas flow rate being about 299 cubic feet per minute.

It will be appreciated that an advantage of driving the pump 4 directly from the engine is that its speed will vary with the engine speed. Consequently the pump can be arranged to 'match' the supply of air to the supply of exhaust gas so as to ensure that sufficient oxygen is supplied to the catalyst to remove substantially all carbon monoxide even when the engine is running in a condition producing maximum carbon monoxide, yet not to supply so much air that it reduces the temperature of the mixture at the catalyst to a temperature below the threshold temperature at which the catalyst operates.

However, the pump 4 may be driven by a drive separate from the engine which may be controlled to vary the pump output with the engine speed in other ways.

It is found that the rapid mixing of the air with the exhaust gas which is achieved by the arrangement described above means that the duct 16 can be positioned very close to the catalyst matrix, which is particularly advantageous because the space available for the catalytic converter is often very limited. As an example, very satisfactory conversion efficiency has been achieved with the duct 16 positioned only about 30 mm from the catalyst matrix. This means that, at the normal rates of exhaust gas flow in LPG fuelled internal combustion engines for fork lift trucks, the time permitted for mixing of the air with the exhaust gas before the mixture enters the catalyst matrix may be only of the order of 0.4 milliseconds.

Figure 5:
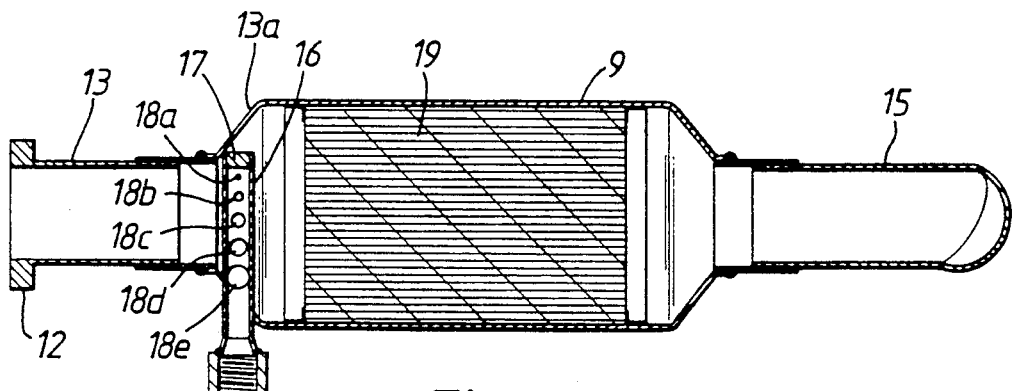
FIG. 5 is a section similar to that of FIG. 4 through a second embodiment of apparatus according to the present invention.
Figure 6:
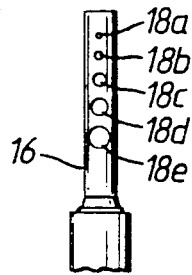
FIG. 6 is an elevational view of part of the apparatus shown in FIG. 5.

The above feature may be utilised to enable the duct 16 to be positioned closer to the catalyst matrix, for example as shown in the embodiment of FIGS. 5 and 6. In this embodiment, which is similar to the embodiment of FIG. 2 to 4 and in which the same reference numerals are used for like part, the duct 16 is located in a duct formed by the inlet portion 13a of the housing for the catalyst matrix immediately upstream of the catalyst matrix. Because the diameter of the duct 13a is larger than that of duct 13 in the previous embodiment, the duct 16 is longer than in the previous embodiment. The duct 16 is, as in the previous embodiment, provided with opening means 18 in the form of two linear arrays of diametrically opposed openings 18a, 18b etc. having flow areas which decrease in the direction of the closed end 17 of the duct 16. However alternative opening means may be provided as described with reference to the previous embodiment. As shown, five openings 18a to 18e are provided in each array, the diameters of the openings being in the ratio 1:2:3:4:5 and the centres of the openings being approximately equally spaced apart in the longitudinal direction of the duct 16. The end 17 of the duct is, in this embodiment, closed with a plug welded to the wall of the duct 16.

It has been found that apparatus as described above can reduce a normal level of carbon monoxide in the exhaust gas of 1% to less than 0.05% and a high level of 4.5% to less than 0.15%.

Although as described above the oxygen containing gas supplied to the duct 16 is air, it will be appreciated that under other circumstances another oxygen containing gas, which may be pure oxygen, could alternatively be supplied. Furthermore, where air is supplied it may be taken from another place than the air intake of the engine.

What is claimed is:

1. Apparatus for introducing a first gas into a stream of a second gas comprising a first duct for supply with the second gas and a second duct extending into a portion of said first duct transversely with respect to the axis of said first duct portion, said second duct having an open end for connection to a supply of the first gas at a pressure above that of the first gas, a closed end and opening means opening into said first duct for flow of the first gas into said first duct to mix with the second gas, said opening means extending longitudinally of said second duct, the flow section of said opening means decreasing in the direction of said closed end thereof.

2. Apparatus as claimed in claim 1, wherein said opening means comprise an array of openings.

3. Apparatus as claimed in claim 2, wherein the openings are spaced apart along the longitudinal extent of said second duct, the area of said openings decreasing in the direction of said closed end thereof.

4. Apparatus as claimed in claim 1, wherein said opening means open generally perpendicularly of the direction of the axis of said first duct portion.

5. Apparatus as claimed in claim 1, wherein said opening means comprise at least one linear array of openings spaced apart along the length of said second duct.

6. Apparatus as claimed in claim 1, wherein said opening means are symmetrically disposed about the longitudinal axis of said second duct.

7. Apparatus as claimed in claim 1, wherein said first duct portion is circular in axial cross-section and said second duct extends diametrically across said first duct portion.

8. Apparatus for reducing the level of carbon monoxide in the exhaust gas of an LPG fuelled internal combustion engine comprising a catalyst for converting carbon monoxide to carbon dioxide, means for supplying the exhaust gas to said catalyst comprising a first duct and means for introducing an oxygen containing gas into the stream of the exhaust gas in said first duct comprising a second duct extending into a portion of said first duct transversely with respect to the axis of said first duct portion, said second duct having an open end for connection to a pump for the supply of an oxygen containing gas under pressure, a closed end, and opening means opening into said first duct for flow of the oxygen containing gas into said first duct to mix with the exhaust gas, said opening means extending longitudinally of said second duct, the flow section of said opening means decreasing in the direction of the closed end of said second duct.

9. Apparatus as claimed in claim 8, wherein said opening means comprises a plurality of openings.

10. Apparatus as claimed in claim 9, wherein said openings are spaced apart along the longitudinal extent of said second duct in one or more linear arrays, the areas of said openings decreasing in the direction of the closed end of said second duct.

11. Apparatus as claimed in claim 8 wherein said opening means face generally perpendicularly to the direction of the axis of said first duct portion.

12. Apparatus as claimed in claim 8, wherein said second duct is generally elongate and said opening means are symmetrically disposed about the elongate axis thereof.

13. Apparatus as claimed in claim 8, wherein said first duct portion is circular in axial cross-section and said second duct extends diametrically across the first duct portion.

14. Apparatus as claimed in claim 8, wherein said catalyst is contained within a housing and said first duct portion provides part of said housing.

15. Apparatus as claimed in claim 8, comprising pump means for supplying the oxygen containing gas to said open end of said second duct at a pressure higher than the pressure of exhaust gas in said first duct.

16. Apparatus as claimed in claim 15, wherein said pump is arranged to be driven by the engine such that its speed will vary with the speed of the engine.

17. Apparatus as claimed in claim 8, wherein the oxygen containing gas is air supplied from the air inlet of the engine.

18. A liquefied petroleum gas fuelled internal combustion engine comprising apparatus for reducing the level of carbon monoxide in the exhaust gas of an LPG fuelled internal combustion engine comprising a catalyst for converting carbon monoxide to carbon dioxide, means for supplying the exhaust gas to said catalyst comprising a first duct and means for introducing an oxygen containing gas into the stream of the exhaust gas in said first duct comprising a second duct extending into a portion of said first duct transversely with respect to the axis of said first duct portion, said second duct having an open end for connection to a pump for the supply of an oxygen containing gas under pressure, a closed end, and opening means opening into said first duct for flow of the oxygen containing gas into said first duct to mix with the exhaust gas, said opening means extending longitudinally of said second duct, the flow section of said opening means decreasing in the direction of the closed end of said second duct.

19. An engine as claimed in claim 18 for a fork lift truck.

20. An engine as claimed in claim 18, having a maximum speed of 3000 rpm.

21. An engine as claimed in claim 18, comprising an air pump having an inlet connected to the air intake of the engine and an outlet connected to the second duct, the pump being driven from the crank shaft of the engine.

22. A method of reducing the level of carbon monoxide in the exhaust gas of an LPG fuelled internal combustion engine comprising supplying the exhaust gas along a first duct to a catalyst for converting the carbon monoxide into carbon dioxide, supplying oxygen containing gas at a higher pressure than the pressure of the exhaust gas in said first duct to a second duct having a closed end which extends transversely of and into said first duct, said second duct having opening means through which the oxygen containing gas flows into said first duct to mix with the exhaust gas therein, said opening means decreasing in flow section towards the closed end of said second duct, and supplying the mixture to said catalyst.

23. A method as claimed in claim 22, wherein the oxygen containing gas is air.

24. A method as claimed in claim 22, wherein the pressure of the oxygen containing gas is varied with engine speed.

25. A method as claimed in claim 22, wherein the oxygen containing gas is pumped to said second duct, the pump being driven by the engine.

* * * * *